March 15, 1932.   W. F. PIOCH   1,849,991
METHOD OF APPLYING BRAKE LININGS
Filed Aug. 10, 1929   2 Sheets-Sheet 1
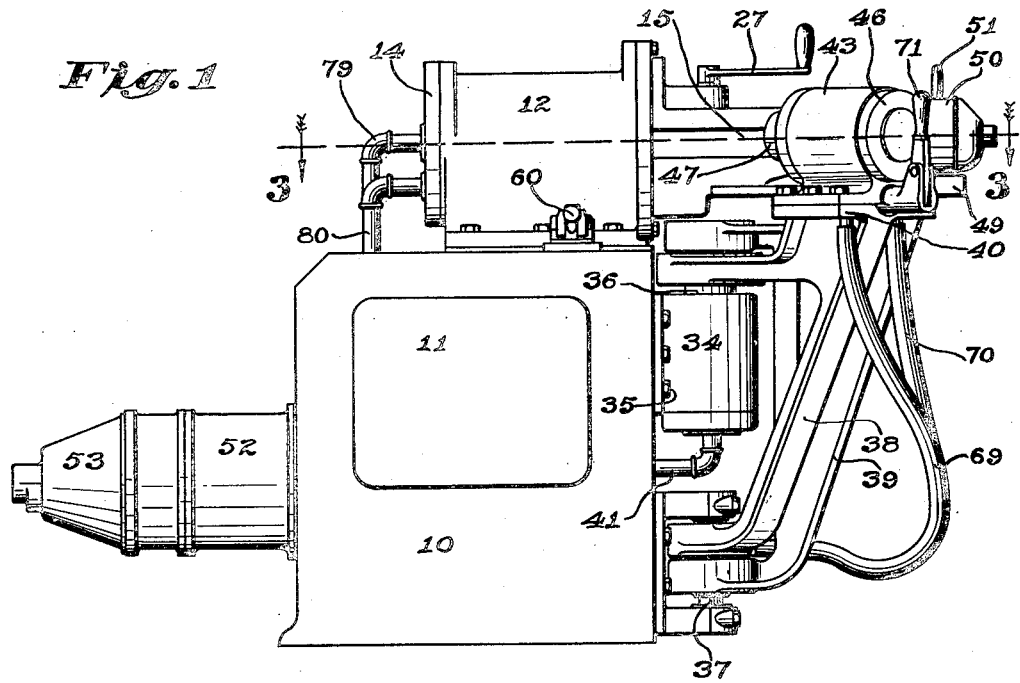
Fig.1
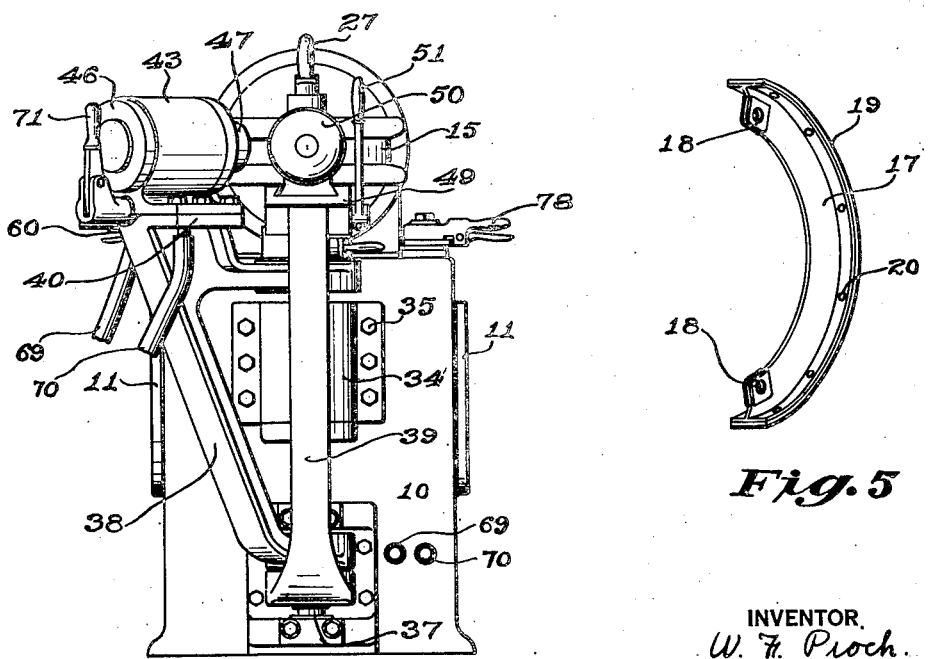
Fig.2
Fig.5
INVENTOR.
W. F. Pioch.
BY
ATTORNEY March 15, 1932.                W. F. PIOCH                1,849,991
                     METHOD OF APPLYING BRAKE LININGS
                Filed Aug. 10, 1929        2 Sheets-Sheet 2
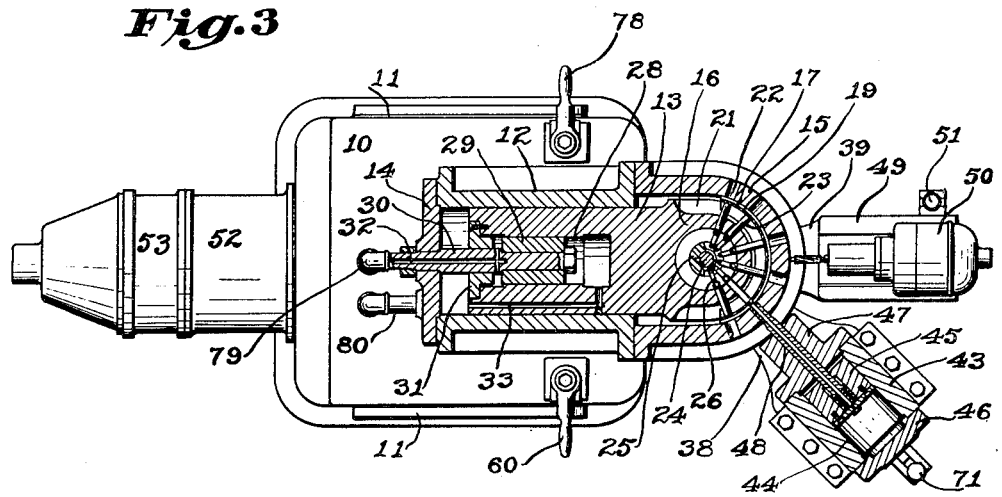
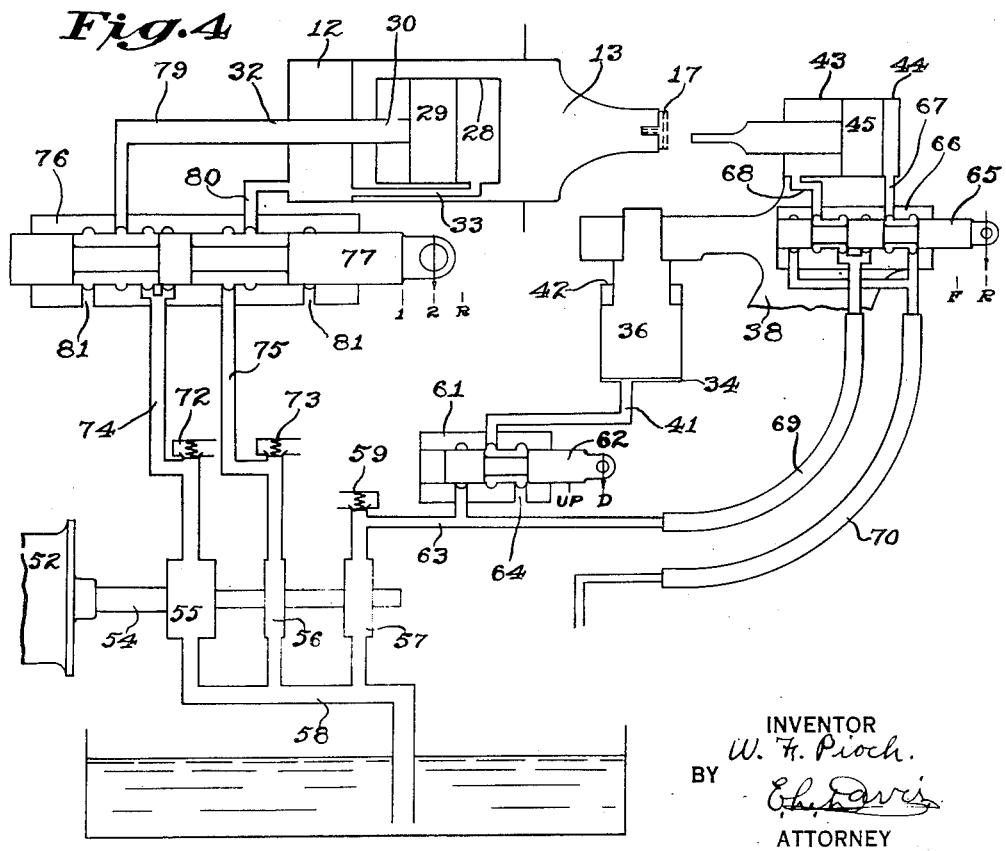
INVENTOR
W. F. Pioch.
BY
ATTORNEY Patented Mar. 15, 1932

1,849,991

UNITED STATES PATENT OFFICE

WILLIAM F. PIOCH, OF DETROIT, MICHIGAN, ASSIGNOR TO FORD MOTOR COMPANY, OF DEARBORN, MICHIGAN, A CORPORATION OF DELAWARE

METHOD OF APPLYING BRAKE LININGS

Application filed August 10, 1929. Serial No. 384,859.

The object of my invention is to provide a method of applying brake lining which will be simple and economical, and will produce a durable brake shoe.

A further object of my invention is to provide a new method of applying brake lining to automobile brake shoes.

Still a further object of my invention is to provide a method of applying brake lining which will produce a smooth braking surface without having to grind the brake lining.

My improved method is particularly adapted to rigid brake shoes of the internal expanding type. The ordinary method of manufacturing such a brake shoe consists of bending a tee iron section to arcuate shape in a punch press and then turning the arcuate periphery of the shoe so formed to remove the surface irregularities. One end of a section of brake lining is then riveted to the shoe and the lining stretched around the periphery by hand and the remaining rivets inserted. It is well known that when the rivets are secured in place the lining is slightly expanded thereby causing the section of the lining between the rivets to rise up slightly from the periphery of the shoe. The brake shoes are then mounted on a grinding arbor and the surface ground to remove the irregularities so that the shoe may fit the brake drum within reasonable limits.

There are several disadvantages to the above mentioned method of applying brake lining. The grinding operation destroys the copper structure of the lining thereby lessening its life and the lining, due to its contact with the brake shoes only at the points where it is riveted, forms a resilient braking surface which causes the brake shoes to chatter when the brakes are applied.

The object of the invention disclosed herein is to provide a method of applying brake lining which will not possess these disadvantages, that is, which will provide a smooth braking surface without resorting to grinding the brake lining, and which will apply the lining so that it hugs the shoe over its full periphery so that a non-resilient braking surface is obtained which will not chatter when the brake shoes are applied to the brake drum.

Still a further object of my invention is to provide a method of applying brake lining which consists in coining the brake lining against a die under a high pressure, and then riveting the lining to the brake shoe while still under this pressure.

With these and other objects in view my invention consists in the arrangement, construction, and combination of the various parts of my improved device, as described in the specification, claimed in my claims, and illustrated in the accompanying drawings, in which:

Figure 1 shows a side elevation of a machine designed to operate according to my improved method.

Figure 2 shows a front elevation of the machine shown in Figure 1.

Figure 3 shows a sectional view taken on the line 3—3 of Figure 1.

Figure 4 shows a diagrammatic view of the hydraulic valves and equipment used to operate the machine, and Figure 5 shows a perspective view of a brake shoe having the lining secured thereto according to the method about to be disclosed.

My improved method in general consists in clamping the brake shoe and lining between cylindrical shaped die members by means of a hydraulic piston and cylinder, then countersinking the rivet holes in the lining with an electric drilling device, and then riveting the lining to the shoe with a hydraulic operated riveting device, the drilling and riveting being accomplished while the shoe and lining are clamped between the cylindrical dies. The co-acting surface of the die adjacent to the lining is identical with a portion of the brake drum with which the brake shoe is to be used.

Referring to the accompanying drawings, I have used the reference numeral 10 to indicate generally a box shaped housing in which a hydraulic pump, relief valves, and control valves are mounted. The housing 10 is provided with a pair of cover plates 11 so that access may be had to the above mentioned parts.

A cylinder 12 is mounted in a horizontal position on the upper face of the housing 10 and is provided with a reciprocating plunger 13 therein. A cylinder head 14 is secured over the rear of the cylinder 12 in the conventional manner.

A semi-circular die 15 having a smooth inner face corresponding to the desired contour of the brake shoe lining, is secured to the forward part of the cylinder 12. The forward end of the plunger 13 is provided with a brake shoe receiving fixture 16 designed to receive the brake shoe 17 shown in Figure 5.

By referring to Figure 5, it will be seen that the brake shoe 17 consists of a T iron section bent to arcuate shape and provided with brake applying openings 18 at the ends of the web. Brake lining 19 is applied over the entire periphery of the shoe and is held in place by suitable rivets 20. In the form of shoe here shown, twelve rivets placed in two rows of six each equally spaced around the shoe are used to secure the lining to the shoe. The web of the shoe 17 is located in an arcuate slot 21 in the fixture 16.

The die 15 is provided with a plurality of pilot openings 22 which serve to locate the countersink drill and the riveting device. These openings 22 are disposed in two rows of six each corresponding to the rivets in the completed brake shoe.

The fixture 16 is provided with a plurality of radially disposed removable anvils 23 for clinching the rivets to the inner side of the brake shoe. These anvils are made removable so that the pilot of the countersink drill may penetrate through the shoe without striking the anvils. A vertical shaft 24 is provided with a master crank 25 adjacent to the anvils 23. A plurality of links 26 connect the inner ends of the anvils 23 to the crank 25 so that when the crank is rotated a portion of a revolution the anvils will be drawn in radially away from the brake shoe; and inversely, when the shaft 24 is rotated in the opposite direction the anvils will be forced outwardly by the links 26 to position adjacent to the rear of the brake shoe. A suitable handle 27 is secured to the upper end of the shaft 24 to operate these anvils.

The inner end of the plunger 13 is provided with a longitudinal bore 28 having a stationary piston 29 mounted therein. The cylinder head 14 is provided with a shaft 30 extending into the bore 28 and which secures the piston 29 in position. A gland 31 is fastened to the inner end of the plunger 13 and co-acts with the shaft 30 and piston 29 to form a means for returning the plunger 13 in the cylinder 12.

A conduct 32 in the shaft 30 is provided to supply oil under pressure to the space between the gland 31 and the piston 29 thereby forcing the plunger 13 rearwardly in the cylinder 12. A conduct 33 is provided in the plunger 13 and connects the inner end thereof with the forward end of the bore 28. The pressure between the inner end of the bore 28 and the head of the plunger 13 is thus equalized.

It may thus be seen that when oil is forced between cylinder head 14 and the plunger 13, the plunger will move outwardly, and when oil is forced in the bore 28 between the gland 31 and the piston 29, the plunger 13 will be forced rearwardly. The machine operator is thus able to reciprocate the plunger at will through the operation of suitable valves.

A vertical cylinder 34 is secured to the forward face of the housing 10 by means of bolts 35 and is provided with a reciprocating plunger 36 therein. A trunnion 37 is secured in a vertical position to the forward face of the housing 10 and is aligned with the axis of the cylinder 34.

A forked bracket 38 is pivotally mounted on the upper end of the plunger 36 on the trunnion 37 so that it may oscillate through about 180° around the fixture 16. A second forked bracket 39 is also pivotally mounted on the upper end of the plunger 36 and on the trunnion 37 in like manner and is also free to oscillate through about 180°.

A pipe 41 is connected to the lower portion of the cylinder 34 so that when oil is forced through this pipe the piston 36 will be raised thereby raising the pair of brackets 38 and 39 against a suitable stop 42 in the cylinder head 34.

The upper end of the bracket 38 is provided with a platform 40 upon which a riveting head 43 is mounted. This head is provided with a horizontal bore 44 into which a piston 45 is reciprocally mounted. A cylinder head 46 is provided for the outer end of the head 43 and a guide member 47 is provided for the inner end. A riveting shaft 48 is secured to the piston 45 and extends inwardly through the guide member 47 in position to enter the openings 22 in the die 15.

The parts are so proportioned that when the plunger 36 is down in the cylinder 34, the shaft 48 will be aligned with the lower row of openings 22 and will be free to oscillate around the piston 34 so as to co-act with all of the lower group openings 22. When oil is forced through the pipe 41, the plunger 36 rises against the stop 42 thereby raising the shaft 48 to position whereby it may enter the upper row of openings 22 to thereby rivet the upper row of rivets 20.

The bracket 39 is provided with a platform 49 upon which an electric drill head 50 is slidably mounted. A hand lever 51 co-acts with a rack and pinion, not shown in the drawings, to reciprocate the drill head 50.

Both brackets 38 and 39 are moved up or down simultaneously by the plunger 36 so that both the riveting head and the drill heads may co-act with either set of openings 22.

When the bracket 38 and riveting head 43 are swung over to the left of the machine against the housing 10, the drill head 50 may then be oscillated to co-act with all of the openings 22, and likewise, when the bracket 39 and drill head 50 is swung over to the right of the housing 10, the riveting head 43 may be oscillated to co-act with all of the openings 22.

The oil pumps for operating the various pistons in this device are shown only diagrammatically by Figure 4 because they are of the standard direct driven gear type pump construction. A pump housing 52 is bolted to the rear face of the housing 10 and an electric motor 53 is secured to the outer end of this housing 52. A motor shaft 54 extends inwardly where it drives three gear type pumps directly. A low pressure pump 55 is first provided, then a high pressure pump 56, and then a medium pressure pump 57 is provided. The various pressures and volumes obtained with these pumps are controlled by regulating relief valves attached thereto and by the thickness and size of the gears used in the pumps.

A common intake line 58 extends to the bottom of the housing 10 which is used as an oil reservoir and supplies oil to the three above mentioned gear pumps. Referring to Figure 4, the medium pressure pump 57 is provided with a conventional pressure regulating valve 59 which is adjusted to maintain approximately 100 pounds oil pressure.

A piston type balanced valve is provided for operating the plunger 36 and is controlled by the hand lever 60. A valve housing 61 is mounted in the inner part of the housing 10 and is provided with a reciprocating plunger 62 which controls the flow of oil to the pipe 41 which is connected to the housing 61. A feed pipe 63 from the pump 57 is also connected with this housing 61 so that oil under medium pressure may be conducted to the cylinder 34. An exhaust port 64 is drilled in this housing so that oil may be discharged through the valve 61 into the reservoir.

When the plunger 62 is in the position shown in Figure 4, the oil from the pump 57 is not allowed to enter the cylinder 34 so that the drill and riveting devices remain in their lower positions. When the plunger 62 is moved forwardly by means of the handle 60, the oil under pressure enters the cylinder 34 through the pipe 41 thereby raising the plunger 36 together with the drill head and riveting device.

The bracket 38 is provided with a balanced valve for operating the riveting device. A plunger 65 is slidably mounted in a valve housing 66 and is formed integral with the lower part of the riveting head 43. A pair of ports 67 and 68 connect the outer and inner ends, respectively, of the bore 44 with the valve housing 66. A flexible hose 69 connects this valve 66 with the feed pipe 63 from the pump 57 so that medium pressure oil is supplied to the valve 66. A second hose 70 is provided for returning the oil from the riveting head to the reservoir in the base of the machine. It is necessary to provide these flexible hoses because of the oscillating feature of the riveting head.

When the valve 66 is in the position shown in Figure 4, the oil enters through the hose 69 into the valve 66 around the plunger 65 and through the port 68 to the forward end of the cylinder 43. The piston 45 is forced rearwardly at this time and the oil from the outer end of the cylinder is discharged through the port 67 and hose 70 into the reservoir. An operating lever 71 is arranged to reciprocate the plunger 65. When the plunger 65 is moved inwardly, the oil under pressure is sent from the intake hose 69 through the port 67 to the outer end of the cylinder 43. The piston 45 then moves forwardly while the oil in the inner end of the cylinder is discharged through the port 68 to the hose 70.

Many types of balanced hydraulic valves are available and no claim is made by the applicant as to the novelty or functioning of his particular type valves.

The operation of the clamping plunger 13 differs from conventional practice in that low pressure oil is used to bring the plunger into position where the brake lining and shoe are adjacent, and high pressure oil is used to set the shoe against the die 15 to remove the irregularities from the lining 19.

The low pressure pump 55 is provided with a regulating valve 72 which is normally adjusted to deliver about 20 pounds oil pressure. The high pressure pump 56 is likewise provided with a regulating valve 73 which is normally set to produce about 500 pounds oil pressure. A pair of feed pipes 74 and 75 extend from the relief valves 72 and 73, respectively, to a valve housing 76 secured in the upper part of the housing 10. A plunger 77 is reciprocally mounted in the housing 76 and is operated by a handle 78 mounted in an accessible position on the top face of the housing 10.

A pipe 79 extends from the shaft 30 to the valve housing 76 and a second pipe 80 extends from the cylinder head 14 to the housing 76. A pair of exhaust ports 81 are provided in the housing 76 and discharge into the reservoir in the housing 10.

The various ports and relief portions in the plunger 76 are so proportioned that, when the plunger is moved to the left of that shown in Figure 4 or to the position marked 1, oil will enter from both of the pumps 55 and 56 through the pipes 74 and 75 into the pipe 80 where it will force the plunger 15 forwardly from the cylinder 12. The pressure of this oil is of course only 20 pounds or that pressure controlled by the relief valve 72, but a large volume of oil is pumped by these two pumps so that the plunger 13 moves quickly into position where the shoe 17 and brake lining 19 are clamped between the fixture 16 and the die 15.

The valve 76 is then moved outwardly to the position shown in Figure 4 where only the high pressure oil is allowed to enter the pipe 80. The low pressure oil from the feed pipe 74 is discharged through the port 81 to the reservoir. The plunger 13 then moves forwardly a short distance or enough to remove the irregularities from the brake lining. The drilling and riveting of the lining is done when the valve is in this position, after which the valve is moved still further outwardly to the position marked 'R' in Figure 4 so that the low pressure oil from the pipe 74 enters the pipe 79 where it is conducted to the space between the flange 31 and the piston 29. The high pressure oil from the pipe 75 is discharged through one of the ports 81 to the reservoir. The port 81 also discharges the oil from the rear of the plunger 13. The plunger 13 is then forced inwardly in the cylinder 12 and a new shoe and section of brake lining inserted in the fixture 16 where the above mentioned cycle of operations are repeated.

Suitable means may be provided for automatically feeding rivets to the riveting head 43 if desired. Further, means other than hydraulic may be used for subjecting the lining and shoe to great pressure while the rivets are being secured in place.

The operator of the machine, while the handle 78 is in the position marked 'R', places a brake shoe in the fixture 16 and a section of brake lining in the die 15. He then moves the handle to the No. '1' position until the fixture, shoe, lining, and die are adjacent to each other. The handle is then moved to the No. '2' position for a second or two where the lining is coined against the die.

The lower group of rivet holes are countersunk by oscillating the bracket 39 to position adjacent to the openings 22 in the die 15. The hand lever 60 is then moved forwardly and the top row of rivet openings countersunk. The handle 27 is then rotated and the anvils 23 brought to position so that the top row of rivets may be riveted. The handle 60 is then moved to its original position and the lower group of rivets secured.

The handle 27 is then returned to its original position and the handle 78 moved to the 'R' position so that the completed shoe may be removed and the operation repeated.

The applicant does not wish to limit himself to the machine shown for accomplishing his method of applying brake lining, as it may be readily seen that with this machine only a limited production of brake shoes is obtainable. The applicant's method whereby the brake shoe and brake lining are clamped under a heavy pressure while the rivet holes are countersunk and the rivets inserted is believed to be new and it is upon the method of producing brake shoes rather than upon the machine for doing so that the applicant's claims are directed.

Many advantages arise through the use of my improved method and it may be well to mention that when such method is used a smooth braking surface is obtained without grinding the brake lining even though the latter is applied to an unfinished brake shoe. A second advantage is obtained because the lining is pressed into intimate contact with the periphery of the brake shoe and is not allowed to expand during the riveting operation, so that a brake shoe assembly is obtained in which the lining is in intimate contact with the full periphery of the shoe. Brake chatter is thereby eliminated when brake shoes made according to this improved method are used. Further, the structure of the brake lining is not destroyed by grinding so that a longer life is obtained from the brake lining.

Some changes may be made in the sequence of operations comprising my improved method as described in my specification, and it is my intention to cover by my claims such changes as may reasonably be included within the scope thereof.

I claim as my invention:

1. A method of applying brake lining consisting of placing a brake shoe adjacent to a section of lining, then engaging the lining against a die possessing a smooth surface with sufficient pressure not only to conform the lining to the contour of the shoe but to form a hard smooth surface upon the lining, and then riveting the brake shoe and lining together while in said position.

2. A method of preparing brake lining consisting of placing a brake shoe adjacent to a section of flexible brake lining, then engaging the lining against a die possessing a smooth surface with sufficient pressure not only to conform the lining to the contour of the shoe but to form a hard smooth surface upon the lining, and then securing the shoe and lining together while in said engaged position.

3. A method of applying brake lining consisting of placing a brake shoe adjacent to a section of flexible brake lining, then engaging the lining against a die possessing a smooth co-acting surface identical to a portion of the brake drum with which the shoe is to be used, said engaging being done with sufficient pressure to not only conform the lining to the contour of the shoe but to form a smooth and hard surface upon the lining, then countersinking openings in the lining, and then securing rivets in said openings while the shoe and lining are in said engaged position.

4. A method of applying brake lining consisting of placing a brake member adjacent to a section of lining, then clamping the member and lining against a die possessing a smooth surface with sufficient pressure not only to conform the lining to the contour of the member but to form a smooth surface upon the lining, and then fixedly securing said lining and member together while in said clamped position.

5. In a device for applying brake lining, a work holder adapted to support a brake shoe and section of brake lining, an arcuate-shaped die possessing a smooth surface disposed adjacent to said work holder, means for moving said work holder toward said die so that the brake shoe and lining are clamped therebetween, said clamping action being accomplished with sufficient pressure to not only conform the lining to the contour of the shoe but to form a smooth hard surface upon the lining, and means for riveting said lining to said shoe while in said clamped position.

6. In a device for applying brake lining, a work holder adapted to support a brake member and section of brake lining, an arcuate-shaped die possessing a smooth surface disposed adjacent to said work holder, means for clamping said brake member and lining between the work holder and die, said clamping action being accomplished with sufficient pressure to not only conform the lining to the contour of the brake member but to form a smooth hard surface upon the lining, and means for fixedly securing said lining and brake member together while in said clamped position.

7. In a device for applying brake lining, a work holder adapted to support a brake shoe and section of brake lining, an arcuate-shaped die possessing a smooth surface disposed adjacent to said work holder, means for clamping said brake shoe and lining between the work holder and die, said clamping action being accomplished with sufficient pressure to not only conform the lining to the contour of the brake shoe but to form a smooth hard surface upon the lining, and means for drilling and countersinking and riveting said lining and shoe together while in said clamped position.

WILLIAM F. PIOCH.